(12) United States Patent
Lee et al.

(10) Patent No.: US 7,579,118 B2
(45) Date of Patent: Aug. 25, 2009

(54) ORGANIC ELECTROLYTIC SOLUTION AND LITHIUM BATTERY EMPLOYING THE SAME

(75) Inventors: Seok-soo Lee, Suwon-si (KR); Han-su Kim, Seoul (KR); Young-gyoon Ryu, Suwon-si (KR); Boris Trofimov, Irkuisk (RU); Galing Myachina, Irkuisk (RU)

(73) Assignee: Samsung SDI Co., Ltd., Suwon-si (KR)

( * ) Notice: Subject to any disclaimer, the term of this patent is extended or adjusted under 35 U.S.C. 154(b) by 609 days.

(21) Appl. No.: 11/472,664

(22) Filed: Jun. 21, 2006

(65) Prior Publication Data

US 2006/0292451 A1 Dec. 28, 2006

(30) Foreign Application Priority Data

Jun. 24, 2005 (KR) ............... 10-2005-0055112

(51) Int. Cl.
*H01M 10/40* (2006.01)
(52) U.S. Cl. .................. 429/326; 429/329; 429/330
(58) Field of Classification Search .............. None
See application file for complete search history.

(56) References Cited

U.S. PATENT DOCUMENTS 5,352,548 A  10/1994  Fujimoto et al.
5,712,059 A  1/1998  Barker et al.
5,714,281 A  2/1998  Naruse et al.

FOREIGN PATENT DOCUMENTS

KR  10-2004-0020633  3/2004
KR  2004-0020633  3/2004

OTHER PUBLICATIONS

J. Power Sources, 51 (1994), 79-104 (on Order).
Megahed, S., et al., *Lithium-ion rechargeable batteries*, Journal of Power Sources, vol. 51, 1994, pp. 79-104.
Korean Patent Abstracts, Publication No. 10-2004-0020633 A, dated Mar. 9, 2004, in the name of Gyeongi Hui Lee.

*Primary Examiner*—Patrick Ryan
*Assistant Examiner*—Ashley Kwon
(74) *Attorney, Agent, or Firm*—Christie Parker & Hale LLP

(57) ABSTRACT

An organic electrolytic solution includes a lithium salt; an organic solvent including a high dielectric constant solvent and a low boiling point solvent; and an additive of a hetero ring compound including a cyano group and an alkenyl group as substituents. The organic electrolytic solution and the lithium battery employing the organic electrolytic solution suppress the reduction decomposition of a polar solvent to improve the capacity retention ratio of the battery. Thus, the charge/discharge efficiency and lifespan of the battery can be improved.

20 Claims, 3 Drawing Sheets

ORGANIC ELECTROLYTIC SOLUTION AND LITHIUM BATTERY EMPLOYING THE SAME

CROSS-REFERENCE TO RELATED PATENT APPLICATION

This application claims the benefit of and priority to Korean Patent Application No. 10-2005-0055112, filed in the Korean Intellectual Property Office on Jun. 24, 2005, the entire disclosure of which is incorporated herein by reference.

FIELD OF THE INVENTION

The present invention relates to an organic electrolytic solution capable of improving a battery charge/discharge cycle and a lithium battery employing the organic electrolytic solution.

BACKGROUND OF THE INVENTION

As portable electronic devices such as video cameras, cellular phones, notebook computers, etc. become more lightweight and have increasingly improved performance, research into batteries used as power supplies for such portable devices is being conducted. In particular, rechargeable lithium secondary batteries are being actively researched as they have three times the energy density per unit weight compared to conventional lead storage batteries, nickel-cadmium batteries, nickel-hydrogen batteries, nickel-zinc batteries, etc., and can be rapidly charged.

In general, since a lithium battery is generally driven at a high operating voltage, a conventional aqueous electrolytic solution cannot be used. This is because lithium contained in an anode and an aqueous solution vigorously react with each other. Thus, an organic electrolytic solution in which a lithium salt is dissolved in an organic solvent is generally used as the electrolyte in a lithium battery. Such organic solvents should generally have high ionic conductivity, a high dielectric constant and low viscosity. However, since it is difficult to obtain a single organic solvent satisfying all these requirements, a mixed solvent may be used including, for example, an organic solvent with a high dielectric constant and an organic solvent with a low viscosity.

When using a carbonate-based polar nonaqueous solvent, the carbon of an anode and an electrolyte in the lithium secondary battery react with each other during the initial charging to form a passivation layer such as a solid electrolyte interface (SEI) film on a negative electrode surface by an irreversible reaction. The SEI film enables the battery to be stably charged and discharged without further decomposition of the electrolytic solution (*J. Power Sources*, 51 (1994), 79-104). The SEI film also acts as an ion tunnel through which only lithium ions pass, and prevents cointercalation of an organic solvent, which solvates the lithium ions and moves with the lithium ions into the carbon anode, thereby preventing a breakdown of the anode structure.

However, since a high voltage of 4 V or greater is repeatedly produced during charging and discharging, the SEI film prepared with the polar solvent and lithium salt can not function ideally. The SEI film can develop cracks, a reduction reaction continues, insoluble salts form inside and outside the anode, gas is generated, and thus cracks occur in the anode structure. The electronic connection deteriorates because of such cracks in the structure of the anode. Therefore, the inner resistance increases and the capacity of the battery decreases. Since the solvent decomposes and the amount of the electrolyte decreases, the electrolyte in the battery is depleted and sufficient ions cannot be transferred.

SUMMARY OF THE INVENTION

The present invention provides an organic electrolytic solution capable of improving a capacity retention ratio, thereby ensuring reliability of a battery.

The present invention also provides a lithium battery which includes the organic electrolytic solution.

According to an embodiment of the present invention, an organic electrolytic solution includes: a lithium salt; a mixed organic solvent comprising a mixture of a high dielectric constant solvent and a low boiling point solvent; and a compound of formula (1):

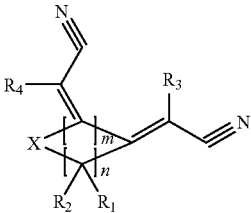

(1)

where X is oxygen or sulfur; each of n and m is independently an integer from 1 to 3; and $R_1$, $R_2$, $R_3$ and $R_4$ are each independently selected from a hydrogen atom, a halogen atom, a hydroxyl group, a substituted or unsubstituted alkyl group having from 1 to 20 carbon atoms, a substituted or unsubstituted alkoxy group having from 1 to 20 carbon atoms, a substituted or unsubstituted alkenyl group having from 2 to 20 carbon atoms, a substituted or unsubstituted aryl group having from 6 to 30 carbon atoms, a substituted or unsubstituted aryloxy group having from 6 to 30 carbon atoms, a substituted or unsubstituted heteroaryl group having from 2 to 30 carbon atoms, and a substituted or unsubstituted heteroaryloxy group having from 2 to 30 carbon atoms.

In another embodiment, the compound of formula (1) may be a compound of formula (2):

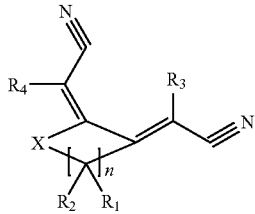

(2)

where, X, n, $R_1$, $R_2$, $R_3$ and $R_4$ are defined above.

In another embodiment, the compound of formula (1) may be a compound of formula (3):

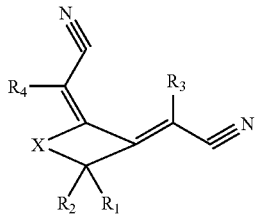

(3)

where X, $R_1$, $R_2$, $R_3$ and $R_4$ are defined above.

In still another embodiment, the compound of formula (1) may be a compound of formula (4):

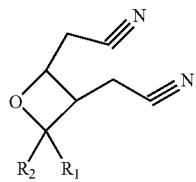

(4)

where $R_1$ and $R_2$ are defined above.

In yet another embodiment, the compound of formula (1) may be a compound of formula (5):

(5)

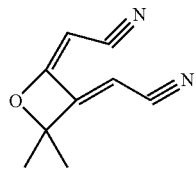

In an embodiment, the amount of the compound of formulae (1) through (5) may be from 0.1 to 5% by weight based on the weight of the organic solvent.

In another embodiment, the amount of the compound of formulae (1) through (5) may be from 1 to 3% by weight based on the weight of the organic solvent.

In an embodiment, the concentration of the lithium salt may be from 0.5 to 2.0 M.

Examples of the high dielectric constant solvent include ethylene carbonate, propylene carbonate, butylene carbonate, γ-butyrolactone, and mixtures thereof.

Examples of the low boiling point solvent include dimethyl carbonate, ethylmethyl carbonate, diethyl carbonate, dipropyl carbonate, dimethoxyethane, diethoxyethane, fatty acid ester derivatives, and mixtures thereof.

According to another embodiment of the present invention, a lithium battery includes: a cathode; an anode; and the organic electrolytic solution described above.

BRIEF DESCRIPTION OF THE DRAWINGS

The above and other features and advantages of the present invention will become more apparent by describing in detail exemplary embodiments thereof with reference to the attached drawings in which:

FIG. 2 is a graph of the capacity retention ratio according to the number of cycle of the lithium batteries according to Examples 8 and 9 and Comparative Example 3; and.

DETAILED DESCRIPTION OF THE INVENTION

Figure 1:
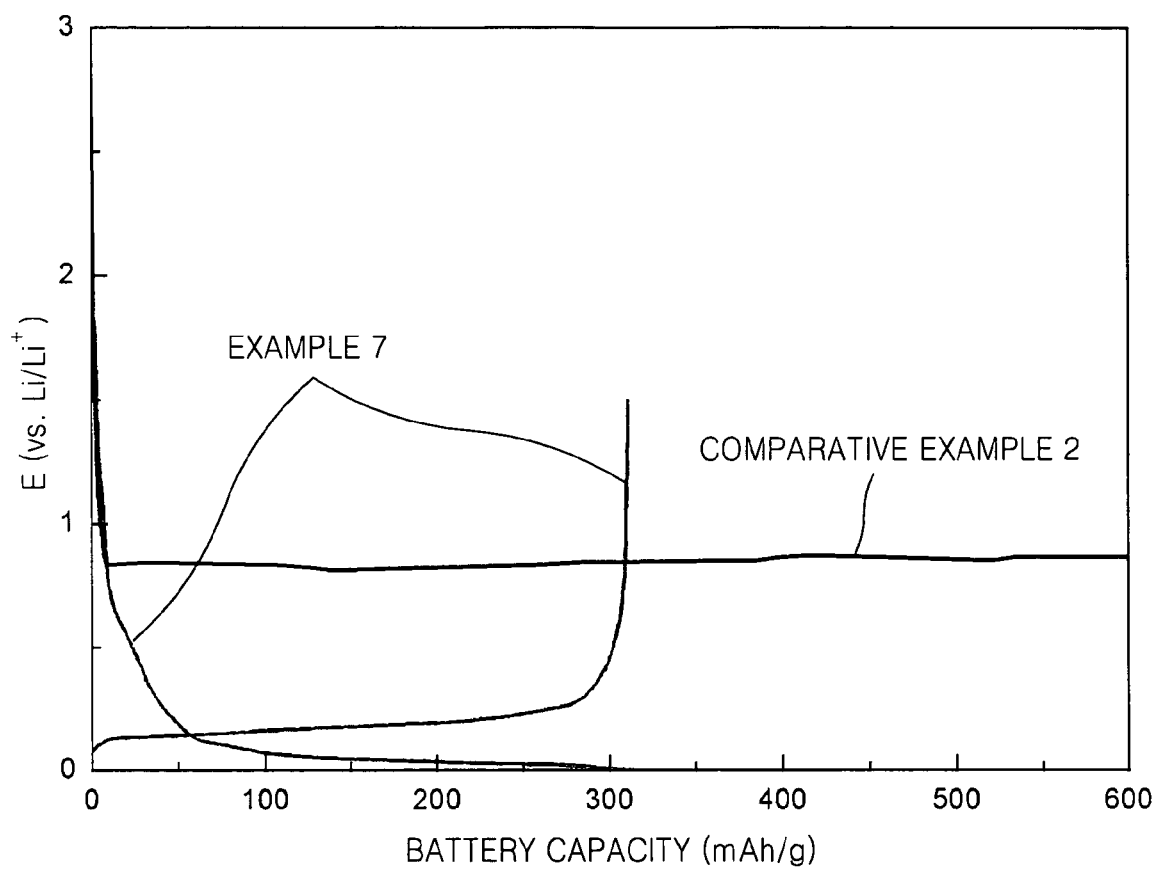
FIG. 1 is a graph illustrating the results of charge and discharge experiments performed on lithium batteries according to Example 7 and Comparative Example 2.

Hereinafter, the present invention will be described more fully with reference to the accompanying drawings.

Organic electrolytic solutions and lithium batteries employing the organic electrolytic solutions according to embodiments of the present invention relatively suppress a reduction decomposition of a polar solvent to improve the capacity retention of the batteries. Thus, the charge/discharge efficiency and lifespan of a battery can be improved.

According to one embodiment, the organic electrolytic solution includes a lithium salt, a mixed organic solvent including a high dielectric constant solvent and a low boiling point solvent, and a compound of formula (1):

(1)

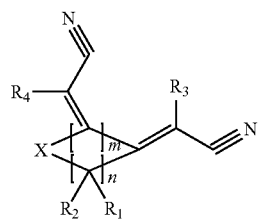

where X is an oxygen or sulfur atom; each of n and m is independently an integer from 1 to 3; and $R_1$, $R_2$, $R_3$ and $R_4$ are each independently selected from a hydrogen atom, a halogen atom, a hydroxyl group, a substituted or unsubstituted alkyl group having from 1 to 20 carbon atoms, a substituted or unsubstituted alkoxy group having from 1 to 20 carbon atoms, a substituted or unsubstituted alkenyl group having from 2 to 20 carbon atoms, a substituted or unsubstituted aryl group having from 6 to 30 carbon atoms, a substituted or unsubstituted aryloxy group having from 6 to 30 carbon atoms, a substituted or unsubstituted heteroaryl group having from 2 to 30 carbon atoms, and a substituted or unsubstituted heteroaryloxy group having from 2 to 30 carbon atoms.

Theoretical reactions of the compound represented by formula (1) in the battery will be described in more detail. However, such description is for the purpose of providing a more complete understanding of the invention, the invention is not intended to be limited by such description, and applicants do not wish to be bound by the theories set forth.

The compound of formula (1) may accept electrons from the electrode more easily than a polar solvent. The compound can be reduced at a lower voltage than the polar solvent, and thus the compound may initiate a reduction before the solvent is reduced by the electrode. The compound of formula (1) has two functional groups including a carbon-carbon double bond moiety and a cyano moiety in which electrons are accepted from the surface of the anode and an electrochemical reaction occurs.

The carbon-carbon double bond in the compound breaks after receiving electrons from the surface of the anode and the compound becomes a radical. The radical reacts with another radical of the compound of formula (1) and forms a dimer radical. In this way, a chain reaction occurs, a polymer is formed and a film is formed on the surface of the anode.

Similar to the carbon-carbon double bond, the cyano moiety can generate a film, for example, by forming a radical and forming a polymer through electrochemical polymerization.

The reactions help to maintain a strong SEI film after charging and discharging over a long period by forming the SEI film with a different composition than when using only the polar organic solvent. The changed strong SEI film effectively prevents the organic solvent from entering the anode during the intercalation of the lithium ions, thereby effectively preventing contact between the organic solvent and the anode. Therefore, the reversibility of the charging and discharging and the efficiency of the battery can be improved.

In another embodiment, the compound of formula (1) may be a compound of formula (2):

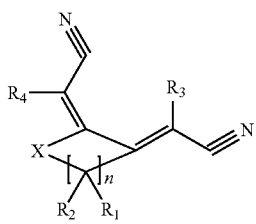

(2)

where X, n, $R_1$, $R_2$, $R_3$ and $R_4$ are defined above. The compound of formula (2) is obtained when m is 1 in a compound of formula (1). The compound of formula (2) includes a ring structure containing an oxygen or sulfur atom as a central structure.

In another embodiment, the compound of formula (2) may be a compound of formula (3):

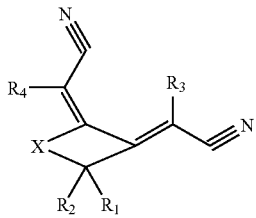

(3)

where X, $R_1$, $R_2$, $R_3$ and $R_4$ are defined above. The compound of formula (3) is obtained when n is 1 in the compound of formula (2). The compound of formula (3) includes an oxetane or thietane structure as a central structure.

In another embodiment, the compound of formula (3) may be a compound of formula (4):

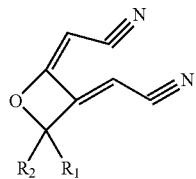

(4)

where $R_1$ and $R_2$ are defined above. The compound of formula (4) is obtained when $R_3$ and $R_4$ are hydrogen atoms and X is an oxygen atom in the compound of formula (3). The compound of formula (4) includes an oxetane structure as a central structure.

In still another embodiment, the compound of formula (4) may be a compound of formula (5) below. The compound of formula (5) is obtained when $R_1$ and $R_2$ are substituted by methyl groups in a compound of formula (4).

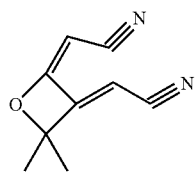

(5)

In an embodiment, the amount of the compound represented by one of formulae (1) to (5) may be from 0.1 to 5% by weight based on the weight of the organic solvent. In another embodiment, the amount of the compound represented by one of formulae (1) to (5) may be from 1 to 3% by weight. When the amount of the compound exceeds 5% by weight, the charge and discharge characteristics are poor since there is an insufficient amount of an effective material on which the performance of a battery depends. When the amount of the compound is less than 0.1% by weight, the desired effects of the present invention cannot be obtained.

The high dielectric constant solvent is not particularly restricted and any known high dielectric constant solvent may be used. Examples include cyclic carbonates such as ethylene carbonate, propylene carbonate, or butylene carbonate, γ-butyrolactone, etc.

Similarly, the low boiling point solvent is not particularly restricted and any known low boiling point solvent may be used. Examples include aliphatic carbonates such as dimethyl carbonate, ethylmethyl carbonate, diethyl carbonate, and dipropyl carbonate, dimethoxyethane, diethoxyethane, fatty acid ester derivatives, etc.

In one embodiment, the volumetric ratio of the high dielectric constant solvent to the low boiling point solvent may be from 1:1 to 1:9. When the ratio is outside of this range, the discharge capacity and charge/discharge cycle life of the battery may degrade.

The lithium salt is any lithium salt that is commonly used in a lithium battery and may include at least one compound selected from $LiClO_4$, $LiCF_3SO_3$, $LiPF_6$, $LiN(CF_3SO_2)$, $LiBF_4$, $LiC(CF_3SO_2)_3$ and $LiN(C_2F_5SO_2)_2$.

The concentration of the lithium salt in the organic electrolytic solution may be from 0.5 to 2.0 M. When the concentration of the lithium salt is less than 0.5 M, the conductivity of the electrolytic solution is low, thereby degrading the performance of the electrolytic solution. When the concentration of the lithium salt is greater than 2.0 M, the viscosity of the electrolytic solution is high, and thus the mobility of lithium ions is low.

A lithium battery employing the organic electrolytic solution and a method of manufacturing the same will now be described.

A lithium battery according to an embodiment of the present invention includes a cathode, an anode, and the organic electrolytic solution according to the previous embodiment.

The lithium battery is not particularly restricted and may be a lithium primary battery or a lithium secondary battery, such as a lithium ion battery, a lithium ion polymer battery, or a lithium sulfur battery.

Figure 3:
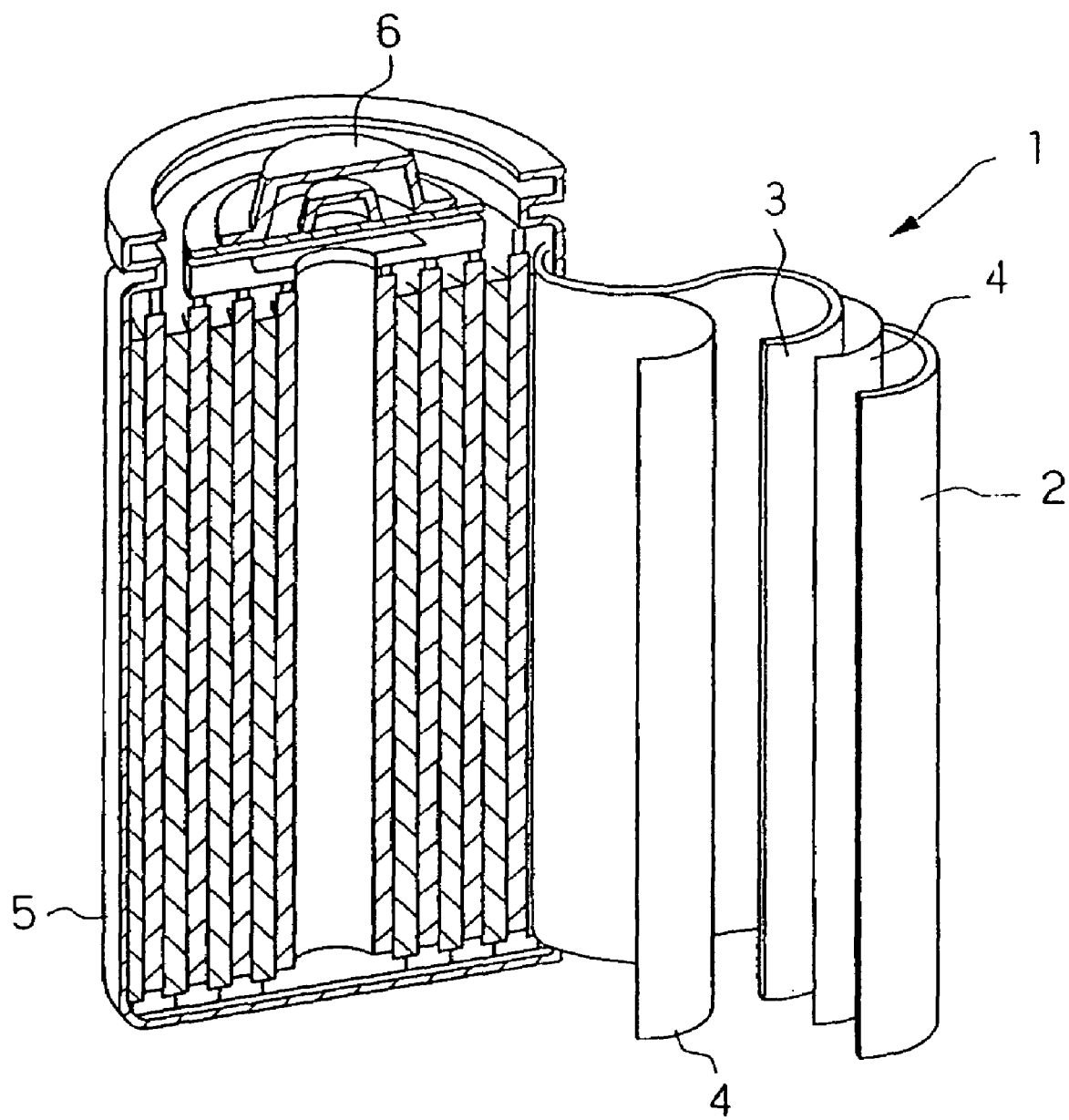
FIG. 3 is a battery including an electrolyte of the present invention.

In an embodiment of the present invention, a lithium battery is provided which includes the improved electrolyte solution described above. As shown in FIG. 3, the lithium battery 1 comprises an anode 2, a cathode 3 and a separator 4 positioned between the anode 2 and cathode 3. The anode 2, cathode 3 and separator 4 are wound together to form an electrode assembly. The electrode assembly is enclosed within a battery case 5 with an electrolyte, and is sealed with a cap assembly 6.

Referring again to the electrolyte solution, the alkyl group as a substituent may include a linear or branched radical having from 1 to 20 carbon atoms. In another embodiment, the alkyl group may include a linear or branched radical having from 1 to 12 carbon atoms. For example, the alkyl radical may be a lower alkyl having from 1 to 6 carbon atoms. Such an alkyl radical may be one of methyl, ethyl, n-propyl, isopropyl, n-butyl, isobutyl, sec-butyl, t-butyl, pentyl, isoamyl, hexyl, etc. A lower alkyl radical having from 1 to 3 carbon atoms can also be used.

The alkoxy group as a substituent may include a linear or branched radical having alkyl moiety consisting of 1 to 20 carbon atoms and an oxygen atom. For example, the alkoxy radical may be a lower alkoxy radical having from 1 to 6 carbon atoms. Such an alkoxy radical may be one of methoxy, ethoxy, propoxy, butoxy and t-butoxy. A lower alkoxy radical having from 1 to 3 carbon atoms can also be used. Such an alkoxy radical can further be substituted by at least one halo atom such as fluoro, chloro, bromo, etc. to provide a haloalkoxy radical. A lower haloalkoxy radical having from 1 to 3 carbon atoms can also be used. Such a radical may be one of fluoromethoxy, chloromethoxy, trifluoromethoxy, trifluoroethoxy, fluoroethoxy and fluoropropoxy.

The alkenyl group as a substituent is a linear or branched aromatic hydrocarbon group having from 2 to 20 carbon atoms and a double bond between carbon atoms. The alkenyl group may have 2 to 12 carbon atoms, for example, 2 to 6 carbon atoms. The branched alkenyl group is a linear alkenyl group having at least one lower alkyl or lower alkenyl group added. The alkenyl group may be unsubstituted or substituted by at least one of the groups including, but not limited to, halo, carboxy, hydroxy, formyl, sulfo, sulfino, carbamoyl, amino and imino. Such an alkenyl group may be one of ethenyl, propenyl, carboxy ethenyl, carboxypropenyl, sulfino ethenyl and sulfonoethenyl.

The aryl group as a substituent is used alone or in a combination, and is a carbocyclic aromatic system having from 6 to 30 carbon atoms and one or more rings. The rings may be attached or fused together using a pendent method. The term "aryl" includes aromatic radicals such as phenyl, naphthyl, tetrahydronaphthyl, indane and biphenyl. For example, the aryl group may be phenyl. The aryl group may have 1 to 3 substituents such as hydroxyl, halo, haloalkyl, nitro, cyano, alkoxy and lower alkylamino.

The aryloxy group as a substituent may be aryl-O—. The definition of the term aryl in the aryloxy group is as above.

The heteroaryl group as a substituent is a monovalent monocyclic or bicyclic aromatic radical that includes 1, 2 or 3 hetero atoms selected from N, O or S and includes a ring composed of from 2 to 30 carbon atoms. The heteroaryl group may be a monovalent monocyclic or bicyclic aromatic radical in which at least one of the hetero atoms is oxidized or quaternized to form, for example, an N-oxide or a quaternary salt. Examples of the heteroaryl group include thienyl, benzothienyl, pyridyl, pyrazinyl, pyrimidinyl, pyridazinyl, quinolinyl, quinoxalinyl, imidazolyl, furanyl, benzofuranyl, thiazolyl, isoxazolyl, benzisoxazolyl, benzimidazolyl, triazolyl, pyrazolyl, pyrolyl, indolyl, 2-pyridonyl, 4-pyridonyl, N-alkyl-2-pyridonyl, pyrazinonyl, pyridazynonyl, pyrimidinonyl, oxazolonyl, corresponding N-oxides thereof (e.g., pyridyl N-oxide, quinolinyl N-oxide), and quaternary salts thereof, but are not limited thereto.

The heteroaryloxy group as a substituent may be heteroaryl-O— and the definition of heteroaryl of the heteroaryloxy group is as disclosed above.

The lithium battery of an embodiment of the present invention can be manufactured as follows.

First, a cathode active material, a conducting agent, a binder and a solvent are mixed to prepare a cathode active material composition. The cathode active material composition is directly coated on an aluminum current collector and dried to prepare a cathode plate. Alternatively, the cathode active material composition is cast on a separate substrate to form a cathode active material film and the film is peeled from the substrate and laminated to an aluminum current collector to prepare a cathode plate.

The cathode active material is any lithium containing metal oxide that is commonly used in the art, and examples include $LiCoO_2$, $LiMn_xO_{2x}$, $LiNi_{x-1}Mn_xO_{2x}$ (where x=1 or 2), $Ni_{1-x-y}Co_xMn_yO_2$ (where $0 \leq x \leq 0.5$ and $0 \leq y \leq 0.5$), etc.

Carbon black may be used as the conducting agent. The binder may be a vinylidene fluoride/hexafluoropropylene copolymer, polyvinylidene fluoride, polyacrylonitrile, polymethylmethacrylate, polytetrafluoroethylene, a mixture thereof, or a styrene butadiene rubber-based polymer. The solvent may be one of N-methylpyrrolidone, acetone, water, etc. The amounts of the cathode active material, the conducting agent, the binder and the solvent are well known in the art.

Similarly, an anode active material, a conducting agent, a binder and a solvent are mixed to prepare an anode active material composition. The anode active material composition is directly coated on a copper current collector, or is cast on a separate substrate to form an anode active material film and the film is then peeled from the substrate and laminated to a copper current collector to obtain an anode plate. Amounts of the anode active material, the conducting agent, the binder and the solvent are those commonly used in a lithium battery.

Silicon metal, a silicon thin film, lithium metal, a lithium alloy, carbonous material or graphite is used as the anode active material. The conducting agent, the binder and the solvent in the anode active material composition are the same as those in the cathode active material composition. If desired, a plasticizer may be added to the cathode active material composition and the anode active material composition to produce pores in the electrode plates.

The separator may be composed of any material that is commonly used in a lithium battery. A material having a low resistance to the movement of ions of the electrolyte and a good ability to absorb the electrolytic solution may be used. Examples include non-woven or woven fabrics selected from the group consisting of glass fiber, polyester, polyethylene, polypropylene, polytetrafluoroethylene (PTFE, for example, TEFLON®) and combinations thereof. More specifically, a lithium ion battery may use a windable separator composed of one of polyethylene, polypropylene, etc., and a lithium ion polymer battery uses a separator having an excellent ability to impregnate an organic electrolytic solution. The separator may be prepared using the following method.

A polymer resin, a filler and a solvent are mixed to prepare a separator composition. The separator composition is directly coated on an electrode and dried to form a separator film. Alternatively, the separator composition is cast on a substrate and dried to form a separator film and the film is peeled from the substrate and laminated to an electrode.

The polymer resin is not particularly restricted and can be any material that is used in a conventional binder for an electrode plate. Examples of the polymer resin include vinylidenefluoride/hexafluoropropylene copolymers, polyvinylidenefluoride, polyacrylonitrile, polymethylmethacrylate and mixtures thereof. In particular, vinylidenefluoride/hexafluoropropylene copolymer containing 8 to 25% by weight of hexafluoropropylene can be used.

The separator is interposed between the cathode plate and the anode plate to form a battery assembly. The battery assembly is wound or folded and placed in a battery case that may be cylindrical, rectangular, or various other shapes. Then, the organic electrolytic solution according to an embodiment of the present invention is injected into the battery case to complete the lithium ion battery.

Alternatively, a battery assembly is prepared in the form of a bicell and the organic electrolytic solution according to an embodiment of the present invention is impregnated therein.

Then, the assembly is placed in a pouch and sealed to complete the lithium ion polymer battery.

The present invention will now be described in greater detail with reference to the following examples. The following examples are for illustrative purposes only and are not intended to limit the scope of the invention.

EXAMPLE 1

Preparation of an Electrolytic Solution

1% by weight of 2,2-dimethyl-3,4-di(cyanomethylene)oxetane represented by formula (5) was added as an additive to an organic solvent mixture containing 30% by volume of ethylene carbonate and 70% by volume of diethyl carbonate and 1.3 M $LiPF_6$ was used as a lithium salt to prepare an organic electrolytic solution:

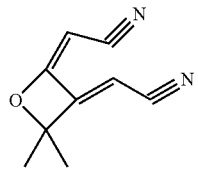

(5)

EXAMPLE 2

Preparation of an Electrolytic Solution

An organic electrolytic solution was prepared in the same manner as in Example 1, except that 3% by weight of 2,2-dimethyl-3,4-di(cyanomethylene)oxetane represented by formula (5) was used.

EXAMPLE 3

Preparation of an Electrolytic Solution

An organic electrolytic solution was prepared in the same manner as in Example 1, except that 5% by weight of 2,2-dimethyl-3,4-di(cyanomethylene)oxetane represented by formula (5) was used.

EXAMPLE 4

Preparation of an Electrolytic Solution

An organic electrolytic solution was prepared in the same manner as in Example 1, except that 0.1% by weight of 2,2-dimethyl-3,4-di(cyanomethylene)oxetane represented by formula (5) was used.

EXAMPLE 5

Preparation of an Electrolytic Solution

An organic electrolytic solution was prepared in the same manner as in Example 1, except that 10% by weight of 2,2-dimethyl-3,4-di(cyanomethylene)oxetane represented by formula (5) was used.

EXAMPLE 6

Preparation of an Electrolytic Solution

An organic electrolytic solution was prepared in the same manner as in Example 1, except that 0.01% by weight of 2,2-dimethyl-3,4-di(cyanomethylene)oxetane represented by formula (5) was used.

COMPARATIVE EXAMPLE 1

Preparation of an Electrolytic Solution

An organic solvent mixture containing 30% by volume of ethylene carbonate and 70% by volume of diethyl carbonate, and 1.3 M $LiPF_6$ as a lithium salt was used to prepare an organic electrolytic solution without an additive.

EXAMPLE 7

Preparation of a Lithium Battery (Carbon Anode)

96% by weight of a graphite-based powder as an anode active material, 4% by weight of PVdF as a binder and 100 ml of N-methylpyrrolidone were mixed. Then, ceramic balls were placed in the mixture and the result was blended for about 10 hours. The mixture was cast on a 19 μm thick copper foil at intervals of 300 μm with a doctor blade to obtain an anode electrode. The anode electrode was placed in an oven at 90° C. and dried for about 10 hours to thoroughly evaporate the N-methylpyrrolidone. Then, the anode electrode was roll-pressed to obtain a 120 μm thick anode electrode.

Lithium was used to form a counter electrode. Lithium was placed on a 20 μm thick copper foil to a thickness of 100 μm and roll-pressed to obtain a 120 μm thick lithium electrode.

3% by weight of 2,2-dimethyl-3,4-di(cyanomethylene)oxetane as represented by formula (5) was added as an additive to an organic solvent mixture containing 30% by volume of ethylene carbonate and 70% by volume of dimethyl carbonate and 1.3 M $LiClO_4$ was used as a lithium salt to prepare an organic electrolytic solution. A 2015 size coin cell was prepared using the 1.3 $cm^2$ anode, the separator, the lithium electrode as the counter electrode, and the organic electrolytic solution.

COMPARATIVE EXAMPLE 2

Preparation of a Lithium Battery (Carbon Anode)

A coin cell was prepared in the same manner as in Example 5, except that an organic solvent mixture containing 30% by volume of ethylene carbonate and 70% by volume of dimethyl carbonate and 1.3 M $LiClO_4$ as a lithium salt were used without an additive.

EXAMPLES 8 to 13

Preparation of Lithium Batteries (Silicon Thin Film Anodes)

A silicon thin film was used to form the anodes. An amorphous silicon film was formed on the surface of a 20 μm thick rolled copper foil using radio frequency (RF) sputtering. The thickness of the thin film electrode was 0.15 μm.

Lithium was used to form counter electrodes. Lithium was coated to a thickness of 100 μm on a 20 μm thick copper foil and roll-pressed to obtain a 120 μm thick lithium electrode.

Pouch cells were prepared using 1×2 cm² anodes, separators, the lithium electrodes as a counter electrodes and the organic electrolytic solutions respectively prepared in Examples 1 to 6.

COMPARATIVE EXAMPLES 4 to 5

Preparation of Lithium Batteries (Silicon Thin Film Anodes)

Pouch cells were prepared in the same manner as in Example 6 except that the organic electrolytic solutions prepared in Comparative Examples 1 to 3 were used.

EXPERIMENTAL EXAMPLE 1

Charge and Discharge Characteristics of Batteries

The lithium electrodes of the coin cell manufactured in Examples 7 and Comparative Example 2 were charged with a constant current of 50 mA per 1 g of the active material until the cell reached 0.001 V. Then, constant voltage charging was performed until the current was reduced to 5 mA per 1 g of the active material at a voltage of 0.001 V. After resting the charged coin cell for 30 minutes, the coin cell was discharged at constant current in 50 mA per 1 g of active material until the voltage reached 1.5 V to obtain a charge/discharge graph. The results are illustrated in FIG. 1. As illustrated in FIG. 1, the charge/discharge region of the graph obtained from Example 7 is flat. However, the lithium battery of Comparative Example 2 is inappropriate for a battery due to irreversible reactions. Thus, it is assumed that the additive according to an embodiment of the present invention effectively forms an SEI film on the surface of the carbon anode.

EXPERIMENTAL EXAMPLE 2

Cycle Characteristics of Batteries

Figure 2:
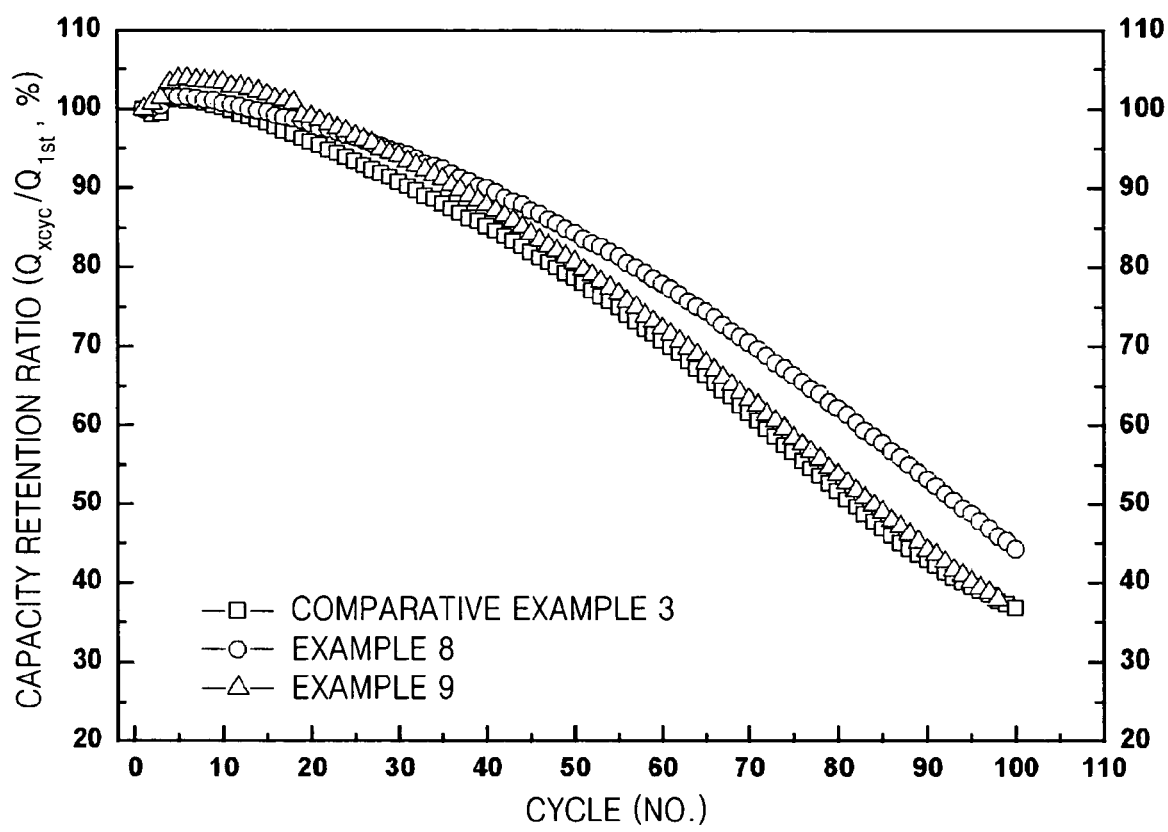

Lithium electrodes of the coin cells manufactured in Examples 8 to 13 and Comparative Examples 3 were charged with a constant current of 50 mA per 1 g of the active material until the cell reached 0.01 V. Then, a constant voltage charging was performed until the current was reduced to 5 mA per 1 g of the active material at a voltage of 0.01 V. After resting the charged coin cell for 30 minutes, the coin cell was discharged at constant current in 50 mA per 1 g of active material until voltage was reached 1.5 V. In the first to the third cycles, charging and discharging were performed at a rate of 0.2 C to form an SEI film easily. From the fourth cycle, the charge and discharge was performed at a rate of 0.5 C. The capacity retention ratio indicates the ratio of the capacity of a given cycle to the capacity of the first cycle. The results are illustrated in Table 1 and the results of Example 8 to 9 and Comparative Example 3 are illustrated in FIG. 2.

TABLE 1

| | Discharge capacity of $1^{st}$ cycle [mAh/g] | Discharge capacity of 100th cycle [mAh/g] | Capacity retention ratio of $100^{th}$ cycle (%) |
|---|---|---|---|
| Example 8 | 2995 | 1327 | 44.3 |
| Example 9 | 2944 | 1142 | 38.8 |
| Example 10 | 3066 | 1205 | 39.3 |
| Example 11 | 3100 | 1170 | 37.7 |

TABLE 1-continued

| | Discharge capacity of $1^{st}$ cycle [mAh/g] | Discharge capacity of 100th cycle [mAh/g] | Capacity retention ratio of $100^{th}$ cycle (%) |
|---|---|---|---|
| Example 12 | 2850 | 1026 | 36 |
| Example 13 | 3110 | 1162 | 37.3 |
| Comparative Example 3 | 3124 | 1151 | 36.8 |

As indicated in Table 1, the capacity retention ratio after 100 cycles was about 35% in Comparative Example 3 which did not have an additive. However, the capacity retention ratios of Examples 8 to 13 ranged from about 35% to about 45%, showing improved charge and discharge characteristics. The difference between the capacity retention ratios is assumed to depend on the degree to which side reactions generated by the charge and discharge are suppressed by the SEI film structure formed during the initial charge and discharge. When the additive of the present invention is used, the SEI film is firm and dense, cracks in the film are suppressed, even after long term usage, reactions between the anode and the solvent are effectively prevented, and thus charge and discharge is more reversible, thus improving the capacity retention ratio.

The organic electrolytic solutions and the lithium batteries employing the organic electrolytic solutions according to embodiments of the present invention suppress reduction decomposition of the polar solvent to improve the capacity retention ratio of the battery. Thus, the charge/discharge efficiency and lifespan of the battery can be improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:
1. An organic electrolytic solution comprising:
a lithium salt;
an organic solvent comprising a high dielectric constant solvent and a low boiling point solvent; and
a compound represented by formula (1):

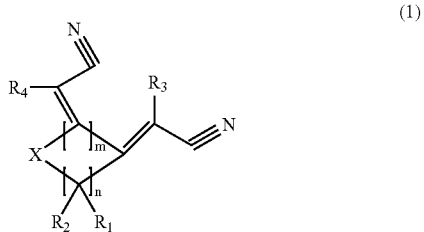

(1)

where X is oxygen or sulfur; each of n and m is independently an integer from 1 to 3; $R_1$, $R_2$, $R_3$ and $R_4$ are each independently selected from the group consisting of a hydrogen atom, a halogen atom, a hydroxyl group, a substituted or unsubstituted alkyl group having from 1 to 20 carbon atoms, a substituted or unsubstituted alkoxy group having from 1 to 20 carbon atoms, a substituted or unsubstituted alkenyl group having from 2 to 20 carbon atoms, a substituted or unsubstituted aryl group having from 6 to 30 carbon atoms, a substituted or unsubstituted aryloxy group having from 6 to 30 carbon atoms, a substituted or unsubstituted heteroaryl group having from 2 to 30 carbon atoms, and a substituted or unsubstituted heteroaryloxy group having from 2 to 30 carbon atoms.

2. The organic electrolytic solution of claim 1, wherein the compound represented by formula (1) is a compound represented by formula (2):

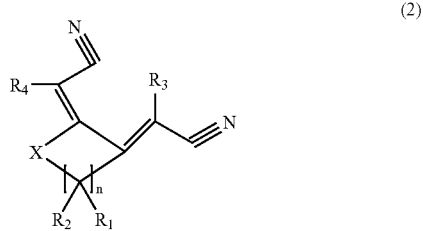

where, X, n, $R_1$, $R_2$, $R_3$ and $R_4$ are defined as in claim 1.

3. The organic electrolytic solution of claim 1, wherein the compound represented by formula (1) is a compound represented by formula (3):

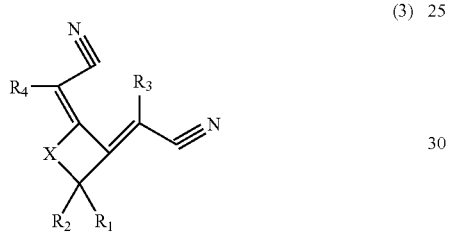

where X, $R_1$, $R_2$, $R_3$ and $R_4$ are defined as in claim 1.

4. The organic electrolytic solution of claim 1, wherein the compound represented by formula (1) is a compound represented by formula (4):

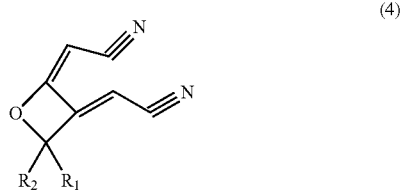

where $R_1$ and $R_2$ are as defined as in claim 1.

5. The organic electrolytic solution of claim 1, wherein the compound represented by formula (1) is a compound represented by formula (5):

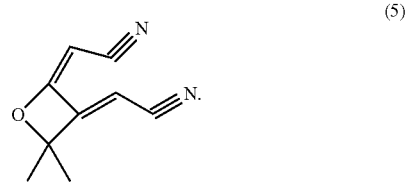

6. The organic electrolytic solution of claim 1, wherein the amount of the compound of formula (1) is from 0.1 to 5% by weight based on the weight of the organic solvent.

7. The organic electrolytic solution of claim 1, wherein the amount of the compound of formula (1) is from 1 to 3% by weight based on the weight of the organic solvent.

8. The organic electrolytic solution of claim 1, wherein the concentration of the lithium salt is from 0.5 to 2.0 M.

9. The organic electrolytic solution of claim 1, wherein the high dielectric constant solvent includes at least one solvent selected from the group consisting of ethylene carbonate, propylene carbonate, butylene carbonate, and γ-butyrolactone.

10. The organic electrolytic solution of claim 1, wherein the low boiling point solvent includes at least one solvent selected from the group consisting of dimethyl carbonate, ethylmethyl carbonate, diethyl carbonate, dipropyl carbonate, dimethoxyethane, diethoxyethane, and a fatty acid ester derivative.

11. A lithium battery comprising: a cathode; an anode; and an organic electrolytic solution comprising: a high dielectric constant solvent and a low boiling point solvent; and a compound represented by formula (1):

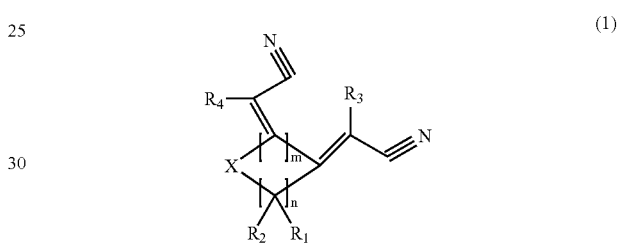

where X is oxygen or sulfur; each of n and m is independently an integer from 1 to 3; $R_1$, $R_2$, $R_3$ and $R_4$ are each independently selected from the group consisting of a hydrogen atom, a halogen atom, a hydroxyl group, a substituted or unsubstituted alkyl group having from 1 to 20 carbon atoms, a substituted or unsubstituted alkoxy group having from 1 to 20 carbon atoms, a substituted or unsubstituted alkenyl group having from 2 to 20 carbon atoms, a substituted or unsubstituted aryl group having from 6 to 30 carbon atoms, a substituted or unsubstituted aryloxy group having from 6 to 30 carbon atoms, a substituted or unsubstituted heteroaryl group having from 2 to 30 carbon atoms, and a substituted or unsubstituted heteroaryloxy group having from 2 to 30 carbon atoms.

12. The lithium battery of claim 11, wherein the compound represented by formula (1) is a compound represented by formula (2):

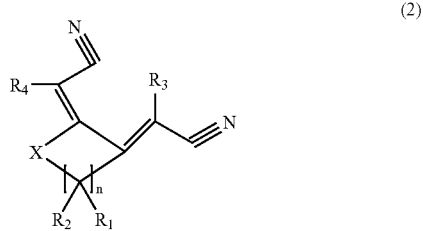

where, X, n, $R_1$, $R_2$, $R_3$ and $R_4$ are defined as in claim 11.

13. The lithium battery of claim 11, wherein the compound represented by formula (1) is a compound represented by formula (3):

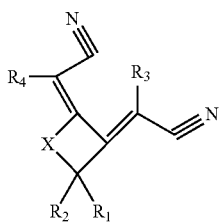

(3)

where X, $R_1$, $R_2$, $R_3$ and $R_4$ are defined as in claim 11.

14. The lithium battery of claim 11, wherein the compound represented by formula (1) is a compound represented by formula (4):

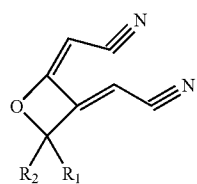

(4)

where $R_1$ and $R_2$ are as defined as in claim 11.

15. The lithium battery of claim 11, wherein the compound represented by formula (1) is a compound represented by formula (5):

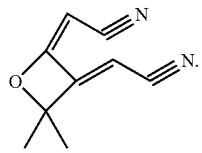

(5)

16. The lithium battery of claim 11, wherein the amount of the compound of formula (1) is from 0.1 to 5% by weight based on the weight of the organic solvent.

17. The lithium battery of claim 11, wherein the amount of the compound of formula (1) is from 1 to 3% by weight based on the weight of the organic solvent.

18. The lithium battery of claim 11, wherein the concentration of the lithium salt is from 0.5 to 2.0 M.

19. The lithium battery of claim 11, wherein the high dielectric constant solvent includes at least one solvent selected from the group consisting of ethylene carbonate, propylene carbonate, butylene carbonate, and γ-butyrolactone.

20. The lithium battery of claim 11, wherein the low boiling point solvent includes at least one solvent selected from the group consisting of dimethyl carbonate, ethylmethyl carbonate, diethyl carbonate, dipropyl carbonate, dimethoxyethane, diethoxyethane, and a fatty acid ester derivative.

* * * * *

UNITED STATES PATENT AND TRADEMARK OFFICE
CERTIFICATE OF CORRECTION

| | | |
|---|---|---|
| PATENT NO. | : 7,579,118 B2 | Page 1 of 1 |
| APPLICATION NO. | : 11/472664 | |
| DATED | : August 25, 2009 | |
| INVENTOR(S) | : Seok-soo Lee | |

It is certified that error appears in the above-identified patent and that said Letters Patent is hereby corrected as shown below:

On the Title Page, item

(75) Inventors            Delete "Galing" Insert -- Galina --

Signed and Sealed this

Twenty-third Day of November, 2010

David J. Kappos
*Director of the United States Patent and Trademark Office*